United States Patent
No et al.

(10) Patent No.: US 8,130,213 B2
(45) Date of Patent: Mar. 6, 2012

(54) STYLUS AND METHOD OF MANUFACTURING THE SAME

(75) Inventors: Jong Woong No, Seoul (KR); Dongsik Kim, Incheon (KR)

(73) Assignees: XG Solutions, LLC, Irvine, CA (US); Seoh Technology Co., Ltd., Bucheon, Gyeonggi-Do (KR)

( * ) Notice: Subject to any disclaimer, the term of this patent is extended or adjusted under 35 U.S.C. 154(b) by 5 days.

(21) Appl. No.: 12/910,429

(22) Filed: Oct. 22, 2010

(65) Prior Publication Data
US 2011/0242062 A1 Oct. 6, 2011

(30) Foreign Application Priority Data
May 28, 2010 (KR) .................. 10-2010-0050647

(51) Int. Cl.
*G06F 3/033* (2006.01)
(52) U.S. Cl. ..... 345/179; 345/173; 345/157; 178/18.01; 178/18.06; 178/19.01; 178/19.03
(58) Field of Classification Search .............. 345/156, 345/157, 173, 179, 204; 178/18.01, 18.06; 178/18.07, 19.01–19.06; 156/245, 246; 382/312–314
See application file for complete search history.

(56) References Cited

U.S. PATENT DOCUMENTS
2004/0047505 A1* 3/2004 Ghassabian .................. 382/186
2009/0289922 A1* 11/2009 Henry ........................... 345/179

FOREIGN PATENT DOCUMENTS
| JP | 10222280 A | 8/1998 |
| JP | 2000122799 A | 4/2000 |
| KR | 2003-0067729 | 8/2003 |
| KR | 20040034197 A | 4/2004 |
| KR | 20060104315 A | 10/2006 |
| KR | 100930816 B1 | 12/2009 |

* cited by examiner

*Primary Examiner* — Lun-Yi Lao
*Assistant Examiner* — Priyank Shah
(74) *Attorney, Agent, or Firm* — Edwards Wildman Palmer LLP

(57) ABSTRACT

The present disclosure relates to a stylus and a method of manufacturing the same. The stylus is configured to select one of plural pieces of content installed in advance in a communication terminal and indicate an associated operation of the selected piece of content to be performed by touching the selected piece of content with the stylus. The stylus includes a non-conductive elastic pen tip and a protective cap made of a conductive fiber material and covering a convex upper portion of the pen tip to protect the convex upper portion of the pen tip in order to prevent activation of an undesired icon through minimization of any possible recognition failure upon selection of an icon among various icons displayed on a touch screen of a communication terminal Further, the method provides a stylus which includes a non-conductive elastic pen tip and a protective cap made of a conductive fiber material and protecting the pen tip to minimize scratches, which can be formed on a touch screen by the stylus in the case of repeated selection of various icons displayed on the touch screen of a communication terminal.

5 Claims, 6 Drawing Sheets

FIG. 2
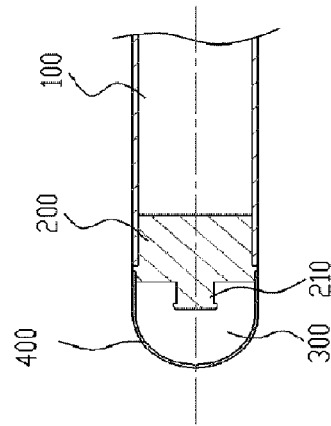
(c)
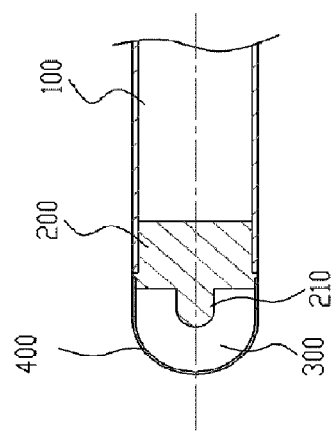
(b)
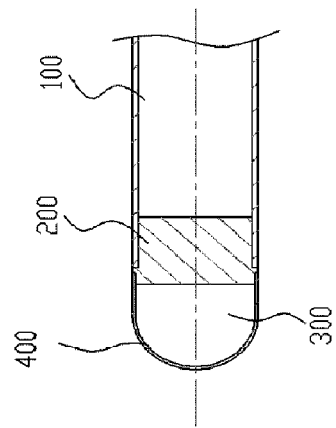
(a)

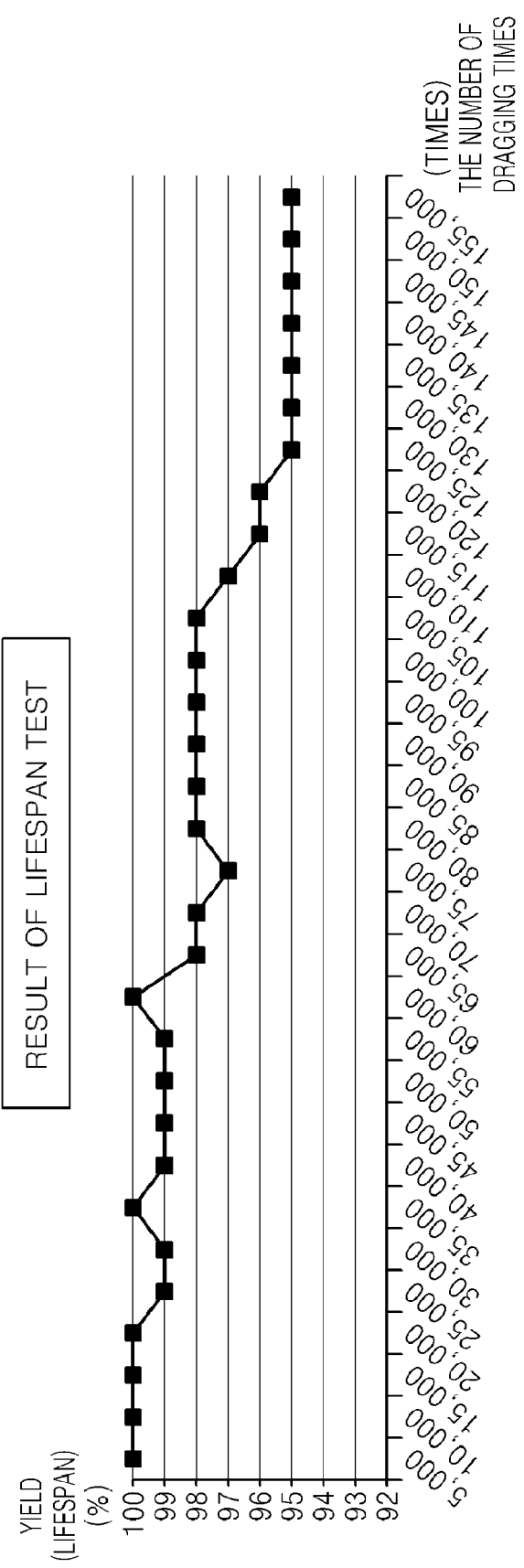

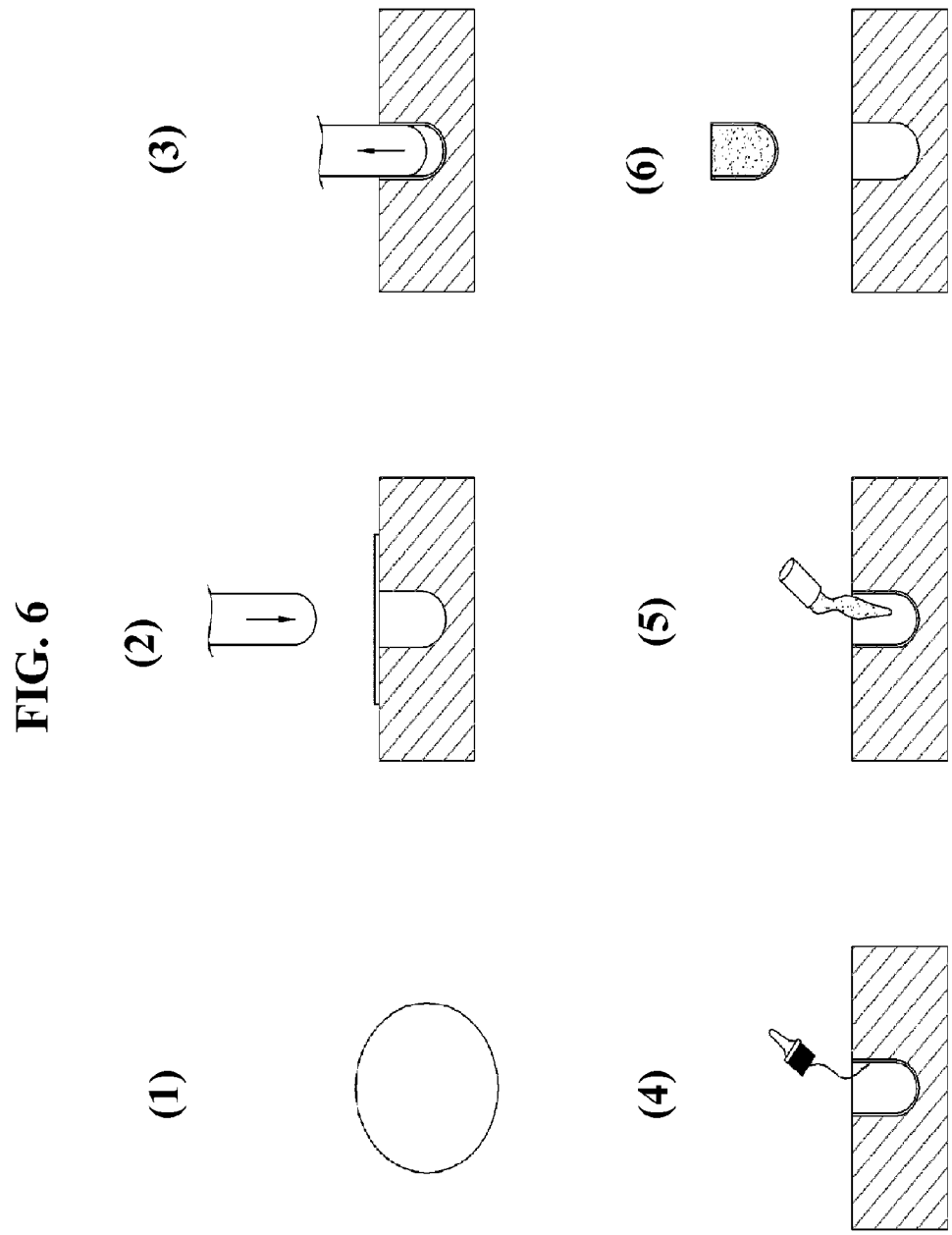

STYLUS AND METHOD OF MANUFACTURING THE SAME

CROSS-REFERENCE TO RELATED APPLICATION

This application claims under 35 U.S.C. §119(a) the benefit of Korean Application No. 10-2010-0050647 filed May 28, 2010, the entire contents of which are incorporated herein by reference.

BACKGROUND

1. Technical Field

The present disclosure relates to communication terminal techniques and, more particularly, to a stylus and a method of manufacturing the same, which may select one of plural pieces of content installed in advance in a communication terminal and allow an associated operation of the selected piece of content to be performed by touching the selected piece of content with the stylus.

2. Description of the Related Art

Generally, styluses include a pressure (or pressure-sensitive) stylus which is used to apply pressure to a touch screen such that an indicated position can be recognized by the touch screen, and a capacitive stylus based on static electricity. The stylus may also be classified into an embedded type stylus which is embedded in a handheld terminal and an exterior type stylus which is separated from a handheld terminal.

In recent years, handheld terminals such as Web pads have employed a touch screen as a new type of input interface. When using the touch screen, a user directly presses a portion of the screen corresponding to a selected icon among various icons on the touch screen and an associated operation or program of the selected icon is then carried out, thereby providing user convenience. Here, since the Web pads have a small size for portability, the screens of the Web pads also have a small size, making it difficult to manipulate icons thereon by hand.

Consequently, a touch pen is used as an input device for the touch screen. Meanwhile, the touch screen (for example, a liquid crystal display (LCD)) has a protective film attached to a glass surface of the touch screen to prevent scratches or pock marks from being formed on the glass surface upon contact between the stylus and the glass surface. Here, the stylus includes a spherical plastic pen tip at a distal end of the stylus to minimize a contact area between the stylus and the protective film of the touch screen.

When the pen tip made of a conductive silicon material is subjected to surface coating, a coating film is likely to be stripped off the pen tip due to friction by frequent contact of the pen tip with the touch screen. As a result, carbon remaining on the touch screen is likely to be adhered to a finger or clothes of a user, thereby causing contamination and lowering reliability.

The above information disclosed in this Background section is only for enhancement of understanding of the background of the invention and therefore it may contain information that does not form the prior art that is already known in this country to a person of ordinary skill in the art.

BRIEF SUMMARY

Embodiments of the present disclosure are conceived to solve such problems of the related art, and one aspect of the present disclosure is to provide a stylus which includes a non-conductive elastic pen tip, and a protective cap made of a conductive fiber material and covering a convex upper portion of the pen tip to protect the convex upper portion of the pen tip in order to prevent activation of an undesired icon through minimization of any possible recognition failure upon selection of an icon using the stylus among various icons displayed on a touch screen of a communication terminal.

Another aspect of the present disclosure is to provide a method of manufacturing a stylus which includes a non-conductive elastic pen tip and a protective cap made of a conductive fiber material and protecting the pen tip to minimize scratches, which can be formed on a touch screen by the stylus in the case of repetitious selection of various icons displayed on the touch screen of a communication terminal.

A further aspect of the present disclosure is to provide a stylus which includes a pen tip having optimized hardness and a protective cap having optimized conductivity to increase recognition rate between the stylus and the touch screen while allowing plural icons to be easily and rapidly displayed when the icons are selected, thereby promoting purchase of products including the stylus to contribute to company profits and industrial development.

In accordance with one aspect, a stylus is configured to select one of plural pieces of content installed in advance in a communication terminal and to indicate an associated operation of the selected piece of content to be performed by touching the selected piece of content with the stylus. The stylus includes: a stick-shaped body; a pointer located on an open side of the stick-shaped body and coupled to opposite supporting sides of the stick-shaped body to be integrated to the stick-shaped body; a pen tip coupled to one side of the pointer and secured by the opposite supporting sides of the stick-shaped body; and a protective cap covering a convex upper portion of the pen tip to protect the convex upper portion of the pen tip.

The pen tip may be formed of a non-conductive elastic material selected from rubbers, silicone rubbers, urethanes, polyvinyl chloride (PVC), poly(tetra-fluoroethylene) (PTFE), polycarbonate (PC) and acetal (polyoxymethylene plastic, PCM); and the protective cap may be formed of a conductive fiber material comprising one selected from a polyethylene terephtahalate (PET) film, PET, hard PVC, and a mixture thereof.

In accordance with another aspect, a method of manufacturing a stylus configured to select one of plural pieces of content installed in advance in a communication terminal and indicate an associated operation of the selected piece of content to be performed by touching the selected piece of content with the stylus is provided. The method includes: preparing a protective cap preform of a conductive fiber material by sequentially stacking nickel, copper and nickel on both sides of a polyester fiber by deposition coating; placing the protective cap preform on a mold for a pen tip, followed by applying a constant pressure to the protective cap preform to form a protective cap having a shape corresponding to an internal shape of the mold; applying a bonding agent to an internal surface of the protective cap, followed by drying the bonding agent for 25~35 minutes; and injecting a non-conductive liquid onto the internal surface of the protective cap in the mold and solidifying the liquid for a preset period of time to form a cylindrical pen tip adhered to the protective cap.

According to one embodiment, the stylus includes a non-conductive elastic pen tip, and a protective cap made of a conductive fiber material and covering the convex upper portion of the pen tip to protect the convex upper portion of the pen tip, thereby preventing activation of an undesired icon through minimization of any possible recognition failure upon selection of an icon using the stylus among various icons displayed on a touch screen of a communication terminal.

According to another embodiment, the method provides a stylus which includes a non-conductive elastic pen tip and a protective cap made of a conductive fiber material and protecting the pen tip, thereby minimizing scratches, which can be formed on a touch screen by the stylus in the case of repetitious selection of various icons displayed on the touch screen of a communication terminal.

According to a further embodiment, the stylus includes a pen tip having optimized hardness and a protective cap having optimized conductivity to increase recognition rate between the stylus and the touch screen while allowing plural icons to be easily and rapidly displayed when the icons are selected, thereby promoting purchase of products including the stylus to contribute to company profits and industrial development.

BRIEF DESCRIPTION OF THE DRAWINGS

The above and other features and advantages of the present disclosure will become apparent from the detailed description of the following embodiments in conjunction with the accompanying drawings:

FIG. 2 shows side sections of a stylus in accordance with exemplary embodiments of the present disclosure;

FIG. 5 is a graph depicting yield (lifespan) of a pen tip in accordance with an exemplary embodiment of the present disclosure; and FIG. 6 is a flowchart of a method of manufacturing a stylus in accordance with an exemplary embodiment of the present disclosure.

DETAILED DESCRIPTION

Figure 1:
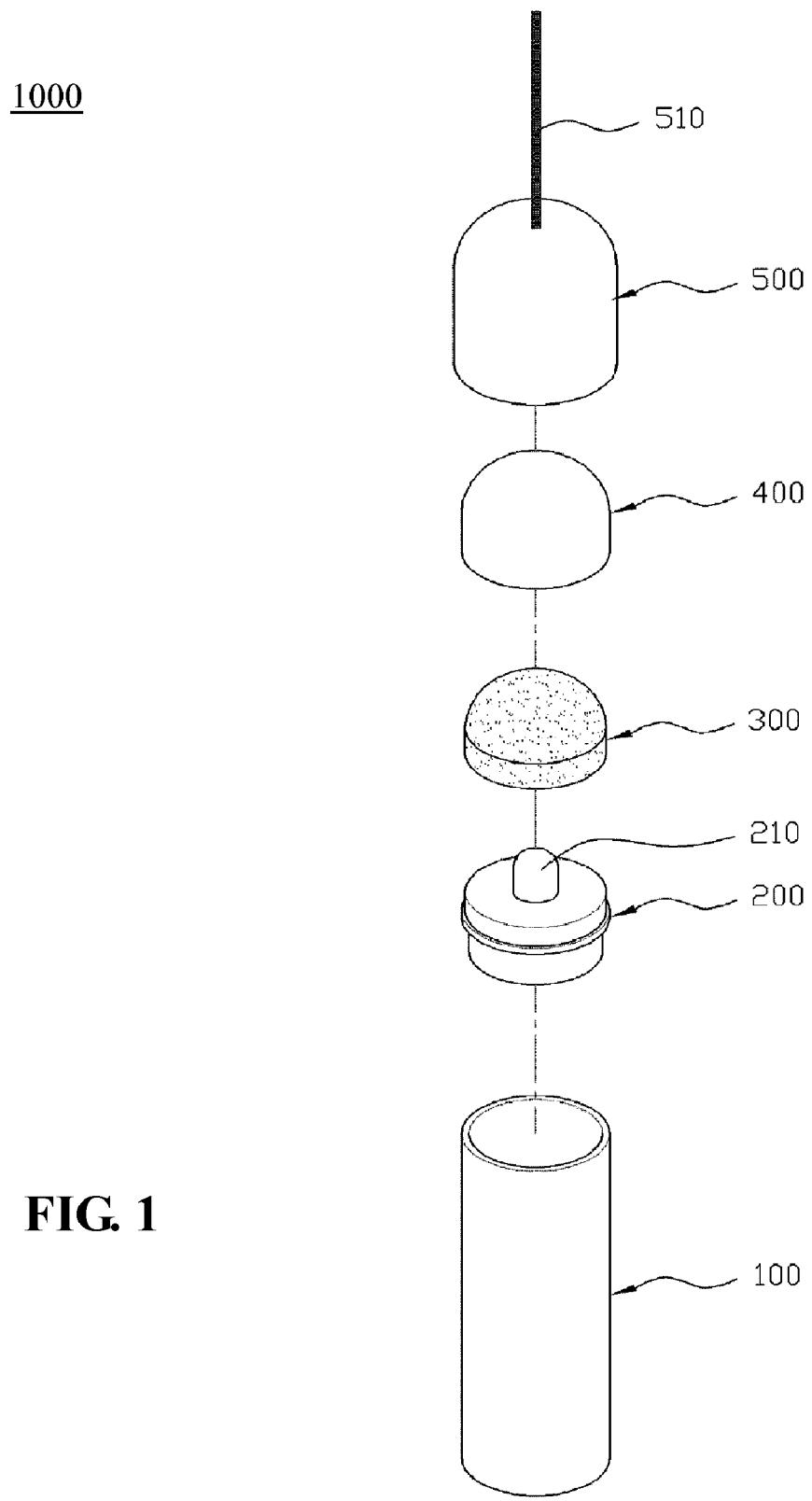
FIG. 1 is an exploded view of a stylus in accordance with an exemplary embodiment of the present disclosure.

Reference will now be made in detail to the preferred embodiment of the present invention, examples of which are illustrated in the drawings attached hereinafter, wherein like reference numerals refer to like elements throughout. The embodiments are described below so as to explain the present invention by referring to the figures.

FIG. 1 is an exploded view of a stylus in accordance with an exemplary embodiment of the present disclosure.

Referring to FIG. 1, a stylus 1000 according to an exemplary embodiment is configured to select one of plural pieces of content installed in advance in a communication terminal and to indicate an associated operation of the selected piece of content to be performed by touching the selected piece of content with the stylus. The stylus 1000 includes: a stick-shaped body 100, a pointer 200, a protrusion 210 on a top side of the pointer 200, a pen tip 300, a protective cap 400, a lid 500, and a securing strap 510 connected to an upper portion of the lid 500.

Referring to FIG. 2(a), the pointer 200 is integrated with the stick-shaped body 100 by placing the pointer 200 on an open side of the stick-shaped body 100 and coupling the pointer 200 to opposite supporting sides of the stick-shaped body 100, thereby preventing the pen tip 300 from being deformed beyond the elastic limit thereof.

The pointer 200 may be formed of one material selected from brass, bronze, stainless steel, aluminum, and alloys thereof. For high productivity, the pointer 200 may be formed of conductive plastics.

The protrusion 210 on the top side of the pointer 200 is formed corresponding to an opening of the pen tip 300 and prevents separation of the pen tip 300 from the pointer 200. The protrusion 210 may have a variety of shapes including a rod shape and be attached to the top side of the pointer 200.

The protrusion 210 is fitted into, for example, a ring-shaped groove formed in the opening of the pen tip 300 thereby to secure connection between the pointer 200 and the pen tip 300.

Referring to FIG. 2(b), the protrusion 210 has a rounded rod shape and is fitted into a space defined in the pen tip 300 to prevent separation of the pen tip 300 from the top side of the pointer 200.

Referring to FIG. 2(c), the protrusion 210 has a rounded rod shape with projections formed at opposite sides thereof and is fitted into a space defined in the pen tip 300 to prevent separation of the pen tip 300 from the top side of the pointer 200.

The pen tip 300 is coupled to one side of the pointer 200 and secured by the opposite supporting sides of the stick-shaped body. The pen tip 300 may be formed of a non-conductive elastic material selected from rubbers, silicone rubbers, urethanes, polyvinyl chloride (PVC), poly(tetra-fluoroethylene) (PTFE) such as Teflon®, polycarbonate (PC), and acetal (polyoxymethylene plastic, PCM).

As such, since the pen tip 300 subjected to frequent contact with a touch screen is formed of the non-conductive elastic material, the pen tip 300 is readily restored to an original shape thereof through elasticity.

Specifically, even after repetitious touch or dragging of the pen tip 300 on a touch screen, the elasticity of the pen tip 300 prevents the pen tip 300 from being deformed or distorted, so that the pen tip 30 maintains an original shape thereof, thereby providing user convenience.

The protective cap 400 covers a convex upper portion of the pen tip 300 and protects the convex upper portion of the pen tip 300. The protective cap 400 may be formed of a conductive fiber material comprising one selected from a polyethylene terephtahalate (PET) film, PET, hard PVC, and a mixture thereof.

Figure 3:
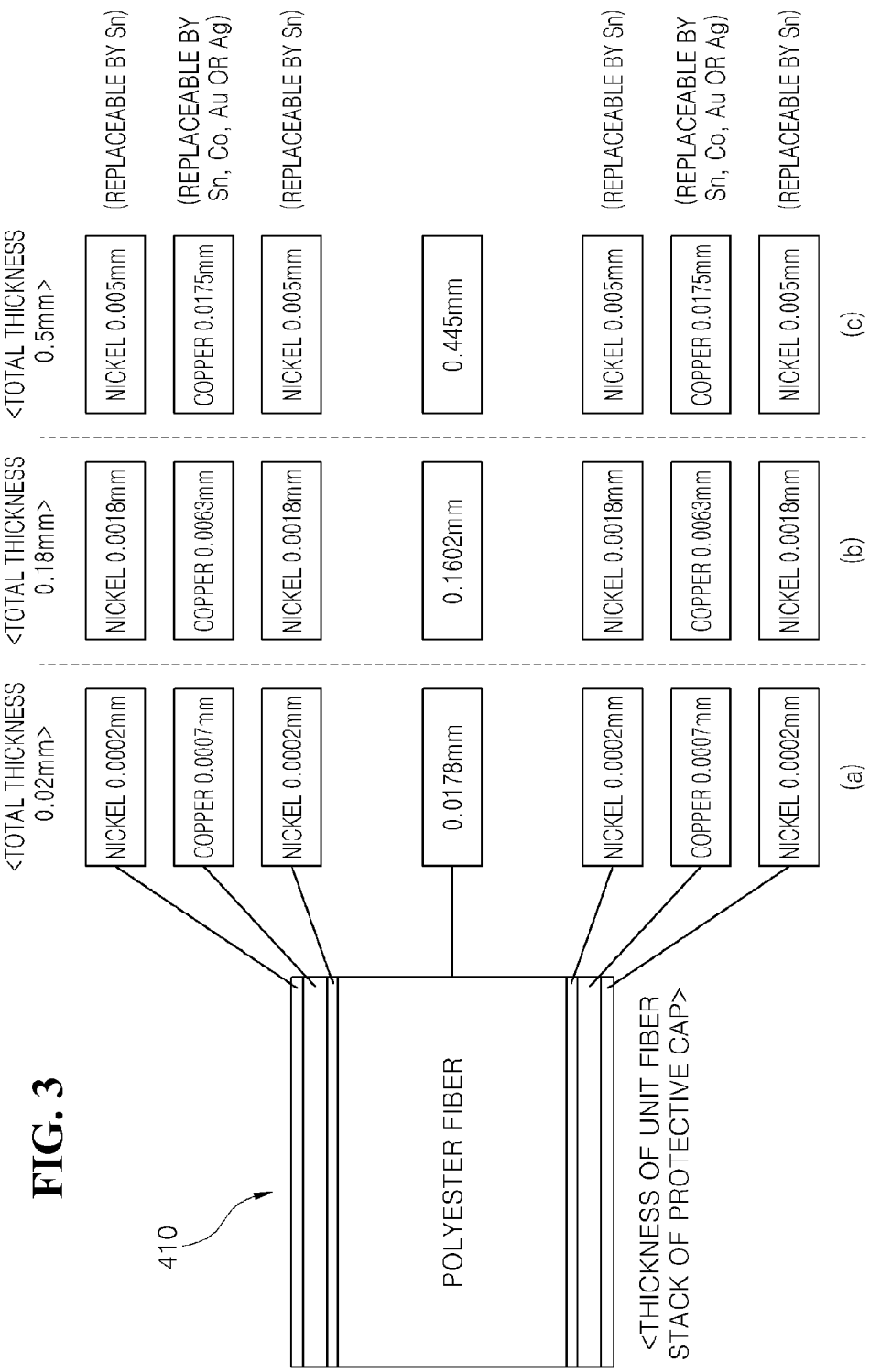
FIG. 3 shows thicknesses of various unit fiber stacks for a protective cap in accordance with an exemplary embodiment of the present disclosure.

As shown in FIG. 3, a unit fiber stack 410 of the protective cap 400 has a thickness of 0.02~0.5 mm. If the unit fiber stack 410 of the protective cap 400 is less than 0.02 mm thick, the unit fiber stack causes low productivity and can be easily damaged upon touching a touch screen. If the unit fiber stack 410 is greater than 0.5 mm thick, the operation of the pen tip 300 is not efficient on the touch screen.

In one embodiment, to form the unit fiber stack 410 of the protective cap 400 having a thickness of 0.02 mm by deposition coating, as shown in FIG. 3 (a), a 0.0002 mm nickel layer, 0.0007 mm copper layer and 0.0002 mm nickel layer are sequentially stacked on one side of a polyester fiber having a thickness of 0.0178 mm, while sequentially stacking a 0.0002 mm nickel layer, 0.0007 mm copper layer and 0.0002 mm nickel layer of on the other side of the polyester fiber.

Here, it should be noted that any one of tin, cobalt, gold and silver may be used instead of the copper, and that tin may be used instead of the nickel, when preparing the unit fiber stack 410 of the protective cap 400 according to this embodiment.

Further, water-soluble polyurethane layers each having a thickness of 0.002~0.008 mm may be further formed on the uppermost and lowermost nickel layers of the protective cap 400, respectively. Namely, since the nickel may cause the user to experience an allergic reaction, the non-toxic and water-soluble polyurethane is coated on both outermost layers of the protective cap 400 to manufacture an environmentally friendly stylus 1000.

In another embodiment, to form the unit fiber stack 410 of the protective cap 400 having a thickness of 0.18 mm by deposition coating, a 0.0018 mm nickel layer, 0.0063 mm copper layer and 0.0018 mm nickel layer are sequentially stacked on one side of a polyester fiber having a thickness of 0.1602 mm, while sequentially stacking a 0.0018 mm nickel layer, 0.0063 mm copper layer and 0.0018 mm nickel layer on the other side of the polyester fiber.

As in the above embodiment, it should be noted that any one of tin, cobalt, gold and silver may be used instead of the copper, and that tin may be used instead of the nickel, when preparing the unit fiber stack 410 of the protective cap 400 according to this embodiment.

Further, water-soluble polyurethane layers each having a thickness of 0.002~0.008 mm may be formed on the uppermost and lowermost nickel layers of the protective cap 400, respectively. Since the nickel may cause the user of the stylus to experience an allergic reaction, the non-toxic and water-soluble polyurethane is coated on both outermost layers of the protective cap 400 to manufacture an environmentally friendly stylus 1000.

In a further embodiment, to form the unit fiber stack 410 of the protective cap 400 having a thickness of 0.5 mm by deposition coating, a 0.005 mm nickel layer, 0.0175 mm copper layer and 0.005 mm nickel layer are sequentially stacked on one side of a polyester fiber having a thickness of 0.445 mm, while sequentially stacking a 0.005 mm nickel layer, 0.0175 mm copper layer and 0.005 mm nickel layer on the other side of the polyester fiber.

As in the above embodiments, it should be noted that any one of tin, cobalt, gold and silver may be used instead of the copper, and that tin may be used instead of the nickel, when preparing the unit fiber stack 410 of the protective cap 400 according to this embodiment.

Further, water-soluble polyurethane layers each having a thickness of 0.002~0.008 mm may be further formed on the uppermost and lowermost nickel layers of the protective cap 400, respectively. Since the nickel may induce allergies to a user of the stylus, non-toxic water-soluble polyurethane is coated on both outermost layers of the protective cap 400 to manufacture an environmentally friendly stylus 1000.

Figure 4:
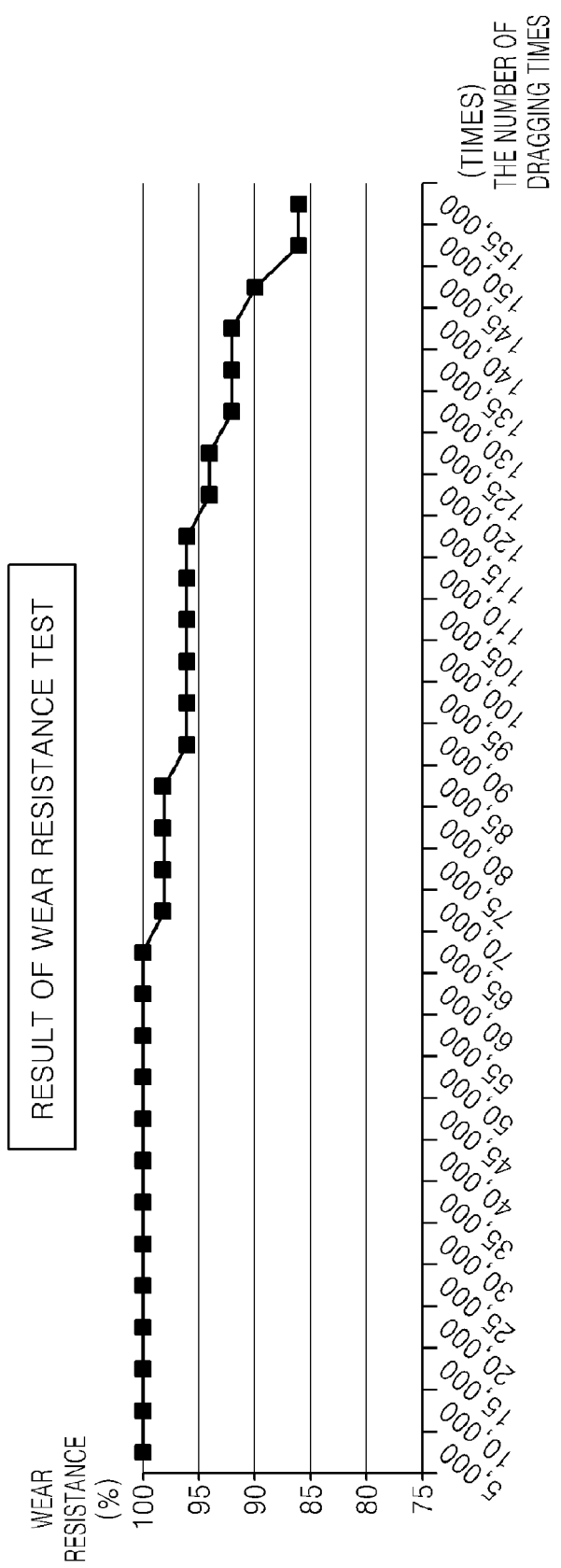
FIG. 4 is a graph depicting wear resistance of a pen tip in accordance with an exemplary embodiment of the present disclosure.

FIG. 4 is a graph depicting wear resistance of the pen tip coupled to the protective cap in accordance with the exemplary embodiment of the present disclosure after the pen tip is dragged on a touch screen 155,000 times or more.

In FIG. 4, it can be seen that, when the pen tip 300 coupled to the protective cap 400 is dragged 270,000 times or more on the touch screen, the wear resistance of the pen tip 300 is lowered below 100%, and that when the pen tip 300 coupled to the protective cap 400 is dragged 115,000 times or more on the touch screen, the wear resistance of the pen tip 300 is lowered below 95%.

Consequently, it can be seen that the pen tip 300 maintains its original shape even after the pen tip 300 is dragged on a touch screen about 110,000 times or more.

FIG. 5 is a graph depicting yield (lifespan) of the pen tip coupled to the protective cap in accordance with the exemplary embodiment of the present disclosure after the pen tip is dragged on a touch screen 155,000 times or more.

In FIG. 5, it can be seen that, when the pen tip 300 coupled to the protective cap 400 is dragged on the touch screen 105,000 times or more, the pen tip has yield fell below 98%, and that when the pen tip 300 coupled to the protective cap 400 is dragged on the touch screen 125,000 times or more, the wear resistance of the pen tip 300 has a yield of 95%.

Consequently, it can be seen that there is no severe problem in lifespan of the pen tip 300 causing an obstacle to performance of the stylus, even after the pen tip 300 is dragged on a touch screen at least 120,000 times.

The lid 500 may be easily mounted or removed from the protective cap 400 to protect the pen tip 300 and the protective cap 400. The lid 500 is put on the protective cap 400 so as to cover a portion of the pointer 200, thereby protecting not only the protective cap 400 but also the pen tip 300 and the pointer 200 from impact by external force.

Further, the lid 500 is securely coupled to the stick-shaped body 1000 to protect the stylus 1000 per se from impact or foreign matter such as dust, which may be present on the protective cap 400 and the pen tip 300, when the stylus 1000 is not used.

The securing strap 510 connected to the upper portion of the lid 500 connects the lid 500 to a communication terminal to prevent loss of the stylus.

Comprehensively, when a user selects an icon displayed on a touch screen of a Web pad or the like using the stylus 1000, the lid 500 is first separated from the stick-shaped body 100 and the pen tip 300 is brought into contact with the icon on the touch screen, with the body 100 gripped by the user.

Here, in the stylus 1000, the protective cap 400 formed in a thin film shape on the pen tip 300 may reduce friction of the pen tip 300, which is brought into contact with the touch screen, thereby minimizing the wear rate of the pen tip 300 while improving lifespan and contact reliability of the pen tip 300 with respect to the touch screen.

In addition, the simple structure of the stylus 1000 including the pen tip 300 and the protective cap 400 for protecting the pen tip 300 as main components may reduce manufacturing costs.

FIG. 6 is a flowchart of a method of manufacturing a stylus in accordance with an exemplary embodiment of the present disclosure.

The method according to this embodiment provides a stylus configured to select one of plural pieces of content installed in advance in a communication terminal and indicate an associated operation of the selected piece of content to be performed by touching the selected piece of content with the stylus.

In the method according to this embodiment, a protective cap preform of a conductive fiber material is first prepared by sequentially stacking nickel, copper and nickel on both sides of a polyester fiber by deposition coating ((1) in FIG. 6). It should be noted that the copper may be replaced by one selected from tin, cobalt, gold and silver in preparing the protective cap.

Then, the protective cap preform is placed on a mold for a pen tip ((2) in FIG. 6), and is subjected to a preset pressure of 25~35 N/cm$^2$ to form a protective cap having a shape corresponding to an internal shape of the mold ((3) in FIG. 6).

Next, an internal surface of the protective cap is coated with a bonding agent, followed by drying for 25~35 minutes ((4) in FIG. 6).

Here, the bonding agent is a uniform mixture of 54~73 percent by weight (wt %) of siloxane, 25~32 wt % of silicic acid, 1~7 wt % of propanol, and 1~7 wt % of benzene.

Then, after a non-conductive liquid is injected onto the internal surface of the protective cap in the mold ((5) in FIG. 6), the liquid is solidified for a preset period of time to form a cylindrical pen tip adhered to the protective cap ((6) in FIG. 6).

Specifically, the non-conductive liquid is uniformly mixed with a curing agent, and the mixture is solidified to allow the pen tip to have a hardness(aska C) of about 5~12.

In one embodiment, the pen tip is formed using a mixture of the non-conductive liquid and the curing agent. Here, the non-conductive liquid may be prepared by uniformly mixing 35~50 wt % of poly dimethylsiloxane, 30~35 wt % of hydroxyl-terminated dimethylsiloxane, 15~20 wt % of trimethylated silica, and 5~10 wt % of zircon.

In this embodiment, the curing agent may be prepared by uniformly mixing 60~79 wt % of poly dimethylsiloxane, 10~15 wt % of tetrapropylorthosilicate, 10~15 wt % of phenyltrimethoxysilane, 0.9~9 wt % of dimethyl tin di-neodecyl ester, and 0.1~1 wt % of methyl alcohol.

In another embodiment, the pen tip is formed to have a hardness(aska C) of about 13~20 using a mixture of the non-conductive liquid and the curing agent. In this embodiment, the non-conductive liquid may be prepared by uniformly mixing 55~65 wt % of poly dimethylsiloxane, 34~40 wt % of hydroxyl-terminated dimethylsiloxane, 1~5 wt % of alpha-hydro-omega-hydroxy-poly(glycol) in a predetermined sequence, and the curing agent may be prepared by uniformly mixing 56~66 wt % of tetraoctylsilicate, 17~22 wt % of dioctyltin carboxylate, and 17~22 wt % of di-n-octyltin dodecate.

In a further embodiment, the non-conductive liquid is heated to 140~160° C. for 18~22 minutes in a non-mixed state with the curing agent, so that the non-conductive liquid is solidified to provide a desired product.

As such, according to the embodiments of the present disclosure, the stylus includes a pen tip having optimized hardness and a protective cap having optimized conductivity to increase recognition rate between the stylus and the touch screen while allowing plural icons to be easily and rapidly displayed when the icons are selected, thereby promoting purchase of products including the stylus to contribute to company profits and industrial development.

Although some embodiments have been described in the present disclosure, it should be understood that the embodiments are given by way of illustration only and do not limit the scope of the present disclosure, and that various modifications, changes and variations can be made by a person having ordinary knowledge in the art without departing from the spirit and scope of the present disclosure, which are limited only by the accompanying claims and equivalents thereof.

What is claimed is:

1. A stylus pen configured to select one of plural pieces of content installed in advance on a communication terminal and indicate an associated operation of the selected piece of content to be performed by touching the selected piece of content, the stylus pen comprising:

a pointer connectedly contacted to one side of a stick-shaped body and coupled to opposite supporting sides of the stick-shaped body to be integrated to the stick-shaped body;

a pen tip coupled to one side of the pointer and secured by the opposite supporting sides of the stick-shaped body; and a protective cap covering a convex upper portion of the pen tip to protect the convex upper portion of the pen tip, wherein the pen tip is formed of a non-conductive elastic material selected from rubbers, silicone rubbers, urethanes, polyvinyl chloride (PVC), poly(tetra-fluoroethylene) (PTFE), polycarbonate (PC) and acetal (polyoxymethylene plastic, PCM), the protective cap is formed of a conductive fiber material selected from a PET film material, a polyethylene terephtahalate (PET), hard PVC, and a mixture thereof, and the unit fiber stack of the protective cap is formed with a thickness of 0.02 to 0.05 mm, and wherein where the unit fiber stack of the protective cap is formed with a thickness of t by deposition coating, the unit fiber stack is characterized in that one selected from a 0.01 t nickel or tin layer, and one selected from 0.035 t copper layer, or 0.01 t nickel or tin layer are sequentially stacked on one side of a polyester fiber having a thickness of 0.89 t, and at the same time one selected from a 0.01 t nickel or tin layer, and one selected from 0.035 t copper layer, or 0.01 t nickel or tin layer are sequentially stacked on the other side of the polyester fiber.

2. The stylus pen according to claim 1, further comprising:

a protrusion formed on a upper portion of the pointer in a variety of projection shapes or bar shapes and fitted into a ring-shaped groove on an open side of the pen tip to secure connection between the pointer and the pen tip; and a lid put on an upper portion of the protective cap so as to cover a portion of the pointer to protect the protective cap, pen tip and pointer from external impact.

3. The stylus pen according to claim 1, wherein the pointer is processed with one selected from brass, bronze, stainless steel, aluminum, and alloys thereof.

4. The stylus pen according to claim 1, wherein the protective cap further comprises water-soluble polyurethane layers each having a thickness of 0.1~0.4 t additionally stacked on the uppermost and lowermost layers of the unit fiber stack of the protective cap, respectively.

5. The stylus pen according to claims 1, wherein one material selected from tin, cobalt, gold and silver is easily used instead of the copper when forming the protective cap.

* * * * *